(12) United States Patent
Kamata et al.

(10) Patent No.: US 11,009,273 B2
(45) Date of Patent: May 18, 2021

(54) EXPANSION VALVE INCLUDING A VIBRATION ISOLATION SPRING HAVING A PLURALITY OF LEGS

(71) Applicants: FUJIKOKI CORPORATION, Tokyo (JP); DENSO CORPORATION, Aichi (JP)

(72) Inventors: Naoki Kamata, Tokyo (JP); Kinya Okutsu, Tokyo (JP); Takashi Mogi, Tokyo (JP); Kurato Yamasaki, Aichi (JP); Shigeki Ito, Aichi (JP)

(73) Assignees: FUJIKOKI CORPORATION, Tokyo (JP); DENSO CORPORATION, Aichi (JP)

( * ) Notice: Subject to any disclaimer, the term of this patent is extended or adjusted under 35 U.S.C. 154(b) by 164 days.

(21) Appl. No.: 16/322,960

(22) PCT Filed: Jul. 21, 2017

(86) PCT No.: PCT/JP2017/026433
§ 371 (c)(1),
(2) Date: Feb. 3, 2019

(87) PCT Pub. No.: WO2018/030116
PCT Pub. Date: Feb. 15, 2018

(65) Prior Publication Data
US 2019/0170411 A1    Jun. 6, 2019

(30) Foreign Application Priority Data

Aug. 9, 2016 (JP) .............................. JP2016-156355

(51) Int. Cl.
*F25B 41/06* (2006.01)
*F25B 41/31* (2021.01)
*F16K 31/00* (2006.01)

(52) U.S. Cl.
CPC ............ *F25B 41/31* (2021.01); *F16K 31/002* (2013.01); *F25B 2341/06* (2013.01);
(Continued)

(58) Field of Classification Search
CPC ................ F25B 41/062; F25B 2341/06; F25B 2341/068; F25B 2341/0683; F25B 2500/12; F25B 2500/13
See application file for complete search history.

(56) References Cited

U.S. PATENT DOCUMENTS

2008/0251742 A1* 10/2008 Ise ...................... F25B 41/062
251/11
2013/0283836 A1* 10/2013 Satake .................. F25B 41/043
62/225

(Continued)

FOREIGN PATENT DOCUMENTS

JP    60-253773 A    12/1985
JP    2003-090648 A    3/2003
(Continued)

OTHER PUBLICATIONS

Supplementary European Search Report for corresponding European Application No. 17839189.2 dated Mar. 5, 2020.
(Continued)

*Primary Examiner* — Jonathan Bradford
(74) *Attorney, Agent, or Firm* — Renner, Otto, Boisselle & Sklar, LLP (57) ABSTRACT

An expansion valve is provided with a valve body including an inlet hole through which a refrigerant flows into a valve chamber, and a valve hole through which the refrigerant flows out of the valve chamber; a valve element configured to adjust an amount of the refrigerant flowing through the valve hole; a power element that is mounted to the valve body and configured to drive the valve element via a valve
(Continued)

rod; a first vibration isolation spring provided in the valve chamber and configured to prevent vibration of the valve element; and a second vibration isolation spring that is in contact with the valve rod and configured to prevent vibration of the valve element.

7 Claims, 9 Drawing Sheets

(52) U.S. Cl.
CPC ... *F25B 2341/0683* (2013.01); *F25B 2500/12* (2013.01); *F25B 2500/13* (2013.01)

(56) References Cited

U.S. PATENT DOCUMENTS

| | | |
|---|---|---|
| 2014/0261765 A1 | 9/2014 | Satake |
| 2016/0097574 A1 | 4/2016 | Kaneko |
| 2018/0135775 A1 | 5/2018 | Ito |

FOREIGN PATENT DOCUMENTS

| | | |
|---|---|---|
| JP | 2005-156046 A | 6/2005 |
| JP | 2006-003056 A | 1/2006 |
| JP | 2013-068368 A | 4/2013 |
| JP | 2013-142506 A | 7/2013 |
| JP | 2014-173788 A | 9/2014 |
| JP | 2014-173807 A | 9/2014 |
| JP | 2016-070637 A | 5/2016 |
| KR | 20040040766 A | 5/2004 |
| WO | 2016/199610 A1 | 12/2016 |

OTHER PUBLICATIONS

International Search Report of PCT/JP2017/026433 dated Oct. 10, 2017, with English translation thereof, and the written opinion of ISA in Japanese language.

Office Action for corresponding Chinese Application No. 201780048787.0 dated Apr. 24, 2020 and its English translation (English translation is an automated translation obtained from the Global Dossier).

Office Action for corresponding Japanese Application No. 2016-156355 dated Oct. 15, 2019.

Office Action for corresponding Chinese Application No. 201780048787.0 dated Sep. 14, 2020 and its English translation (English translation is an automated machine translation obtained from the Global Dossier).

Decision of Refusal for corresponding Chinese Application No. 201780048787.0 dated Dec. 31, 2020 and its English translation (English translation is an automated machine translation).

\* cited by examiner

EXPANSION VALVE INCLUDING A VIBRATION ISOLATION SPRING HAVING A PLURALITY OF LEGS

TECHNICAL FIELD

The present invention relates to an expansion valve having a built-in temperature sensitive mechanism for use in a refrigerating cycle.

BACKGROUND ART

Typically, thermal expansion valves having built-in temperature sensitive mechanisms capable of adjusting the amount of passing refrigerant based on temperature are used in the refrigerating cycles of air conditioners provided in automobiles and the like. A valve body of this type of expansion valve includes an inlet port through which a high-pressure refrigerant is introduced, a valve chamber that communicates with the inlet port, and a valve element driving mechanism referred to as a power element disposed on a top portion of the valve body.

A spherical valve element disposed in the valve chamber is arranged opposing a valve seat of a valve hole formed in the valve chamber. The valve element is supported by a support member disposed in the valve chamber, and the valve element is pushed toward a direction of the valve seat by a coil spring disposed between an adjusting screw mounted to the valve body and the support member. The valve element is operated by a valve rod that is driven by the power element, and controls an opening of a throttle passage formed between the valve element and the valve seat. The refrigerant that passes through the valve hole is sent from an outlet port toward an evaporator.

Here, there are cases where the operation of a compressor may cause pressure fluctuation (pulsation) of the high-pressure refrigerant sent to the inlet port of the expansion valve, and this may lead to vibration of the valve element and the occurrence of abnormal noise.

In the related art, a configuration to prevent such vibration has been proposed in which a vibration isolation spring is provided for suppressing vibration of a valve element (see to Patent Literature 1 and 2, for example).

The expansion valve disclosed in Patent Literature 1 elastically holds a support member that supports a spherical valve element disposed in a valve chamber using a plurality of elastic members inside the valve chamber, and as a result, the valve element is elastically pressed and supported from an outer side thereof toward a valve seat (toward a direction substantially orthogonal to the vertical direction, which is the direction of movement of the valve element), such that the vibration of the valve element can be effectively suppressed.

Further, the expansion valve disclosed in Patent Literature 2 has a configuration in which a vibration isolation spring is arranged in a narrow hole inside the valve body in which a valve rod is inserted in order to apply a desired sliding friction to the valve rod for transmitting the operation of a power element to a spherical valve element, and a leading end of the vibration isolation spring is in contact with the valve rod. According to such a configuration, unnecessary micro vibrations of the valve rod in the vertical direction can be suppressed, and vibration of the valve element is can also be effectively suppressed.

CITATION LIST

Patent Literature

[PTL 1] Japanese Patent Application Laid-Open Publication No. 2005-156046
[PTL 2] Japanese Patent Application Laid-Open Publication No. 2006-3056

SUMMARY OF INVENTION

Technical Problem

Although the configurations of the expansion valves in the related art exert a vibration isolation effect to some degree, they are associated with the following problems. Particularly, when it is attempted to achieve both downsizing and weight reduction of refrigerating cycles provided within automobiles or the like while improving the function and efficiency of the refrigerating cycle, various devices, including the expansion valves disposed in the refrigeration cycle, are also required to be downsized and to achieve high performance.

However, various types of research and development have been continuously performed for expansion valves in the past, and the reality is that the miniaturization of expansion valves is approaching its limit.

In such expansion valves, if a configuration as disclosed in Patent Literature 1 is adopted in which a plurality of leg portions of the vibration isolation spring in the valve chamber are in contact with a side wall of the valve chamber, even if the shapes and materials of the vibration isolation spring are adjusted in various ways, depending on the degree of the pressure fluctuation (that is, the degree of the pressure difference and the cycle of the fluctuation) of the high-pressure refrigerant introduced to the inlet port of the expansion valve, it is not always possible to achieve sufficient suppression of the vibration of the valve element.

The same applies to the configuration disclosed in Patent Literature 2 in which the valve rod is in contact via a ring vibration isolation spring.

Accordingly, the object of the present invention is to provide an expansion valve capable of effectively suppressing the vibration of a valve element due to the influence of a high-pressure refrigerant.

Solution to Problem

In order to solve the problems described above, one typical example of an expansion valve according to the present invention includes a valve body including an inlet hole through which a refrigerant flows into a valve chamber, and a valve hole through which the refrigerant flows out from the valve chamber; a valve element configured to adjust an amount of the refrigerant flowing through the valve hole; a power element that is mounted to the valve body and configured to drive the valve element via a valve rod; a first vibration isolation spring that is provided in the valve chamber and configured to prevent vibration of the valve element; and a second vibration isolation spring that is in contact with the valve rod and configured to prevent vibration of the valve element.

Advantageous Effects of Invention

As the expansion valve according to the present invention is configured as described above, vibration of the valve element due to the influence of the high-pressure refrigerant can be effectively suppressed.

DESCRIPTION OF EMBODIMENTS

First Embodiment

Figure 1:
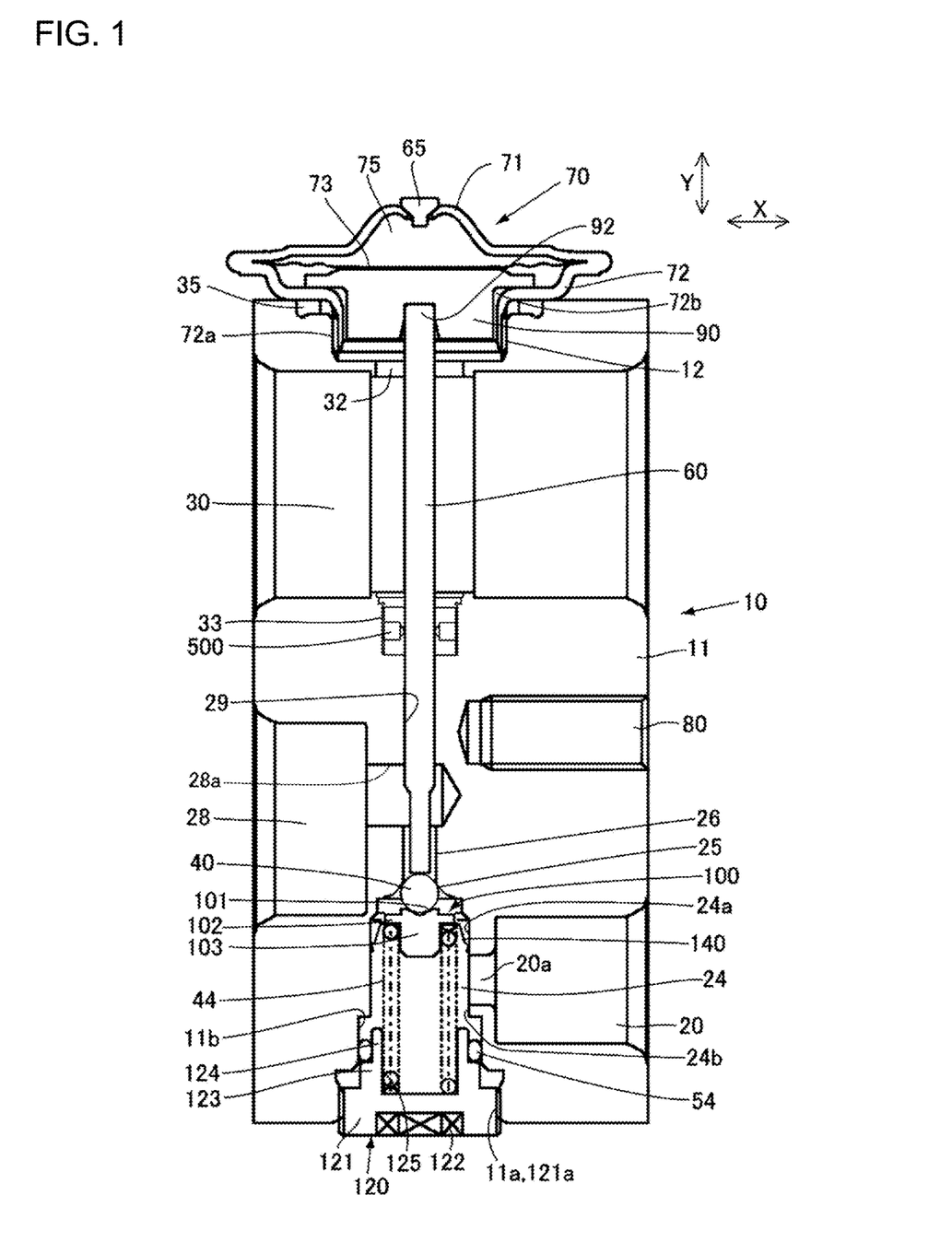
FIG. 1 is a vertical cross-sectional view illustrating a first embodiment of an expansion valve according to the present invention.
Figure 2:
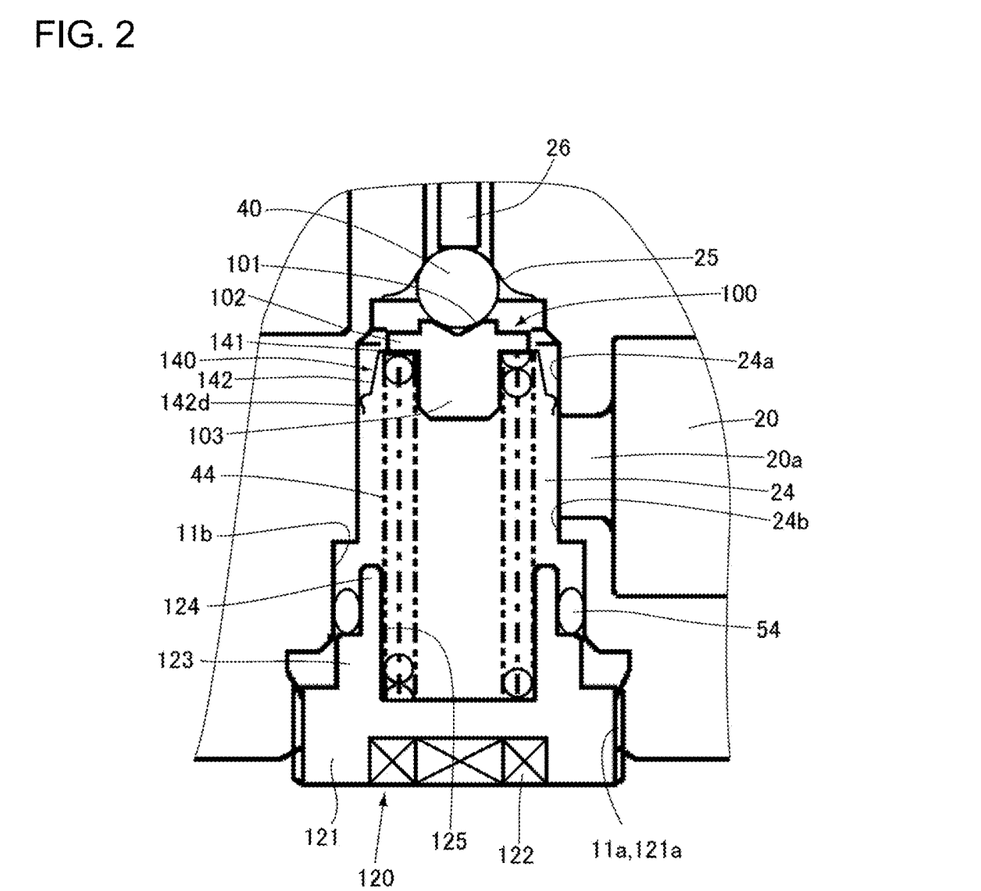
FIG. 2 is a vertical cross-sectional view of a main portion of the expansion valve according to the first embodiment.

FIG. 1 is a vertical cross-sectional view illustrating a first embodiment of an expansion valve according to the present invention. FIG. 2 is a vertical cross-sectional view of a main portion of an expansion valve according to the first embodiment.

As illustrated in FIG. 1, an expansion valve 10 includes a valve body 11, a power element 70, a valve element 40, a valve rod 60, a support member 100, a first vibration isolation spring 140, a coil spring 44, an adjusting screw 120 and a second vibration isolation spring 500.

The valve body 11 is made of an aluminum alloy, for example, and can be obtained by subjecting the aluminum alloy or the like to extrusion molding with the X direction of FIG. 1 set as the extrusion direction, and then performing machining. The valve body 11 includes a power element mounting portion 12, which is an internal screw formed on an upper surface portion and engaged with an external screw 72a of the power element 70 to thereby fix the power element 70, an inlet port 20 through which a high-pressure refrigerant is introduced, an outlet port 28 through which the refrigerant flowing in from the inlet port 20 flows out, a return passage 30 of the refrigerant, a hole portion 33 to which the second vibration isolation spring 500 is attached, an internal screw 11a formed on a bottom side portion of the valve body 11, a mounting hole (or an internal screw for mounting) 80 for mounting the valve body 11 to an evaporator or other components not shown.

The power element mounting portion 12 is formed as a bottomed cylindrical hole formed having a circular opening on an upper surface of the valve body 11 and having an internal screw formed on an inner wall surface thereof. An opening 32 that reaches (communicates with) the return passage 30 is formed at the center of the bottom portion of the hole. Here, the center axis direction of the power element mounting portion 12 is a direction (the y direction) that is substantially orthogonal to the passing direction (X direction) of the refrigerant passing through the inside of the return passage 30.

The internal screw 11a is formed so as to open on the lower side of the valve body 11, and an insertion hole 11b is formed on an upper portion thereof. By sealing an opening of the internal screw 11a with the adjusting screw 120, a valve chamber 24 is formed in the inner side of the valve body 11. The valve chamber 24 has a cylindrical side wall surface, and the surface above the upper end of the inlet hole 20a is referred to as an upper wall surface 24a, and the surface below the lower end of the inlet hole 20a is referred to as a lower wall surface 24b. The vertical length of the upper wall surface 24a is sufficient to enable the first vibration isolation spring 140 described later to move in a sliding motion. In addition, it is sufficient for the portion between the upper end of the insertion hole 11b and the inlet hole 20a to have a thickness capable of ensuring the necessary strength.

The inlet port 20 is formed to communicate with the valve chamber 24 from the side of the valve chamber 24 via an inlet hole 20a having a smaller diameter than the inlet port 20. In addition, a narrow portion 28a having a smaller diameter than the outlet port 28 is provided behind the outlet port 28, and the narrow portion 28a is disposed above the valve chamber 24. The narrow portion 28a communicates with an upper end portion of the valve chamber 24 via a valve hole 26 that serves as an orifice. A valve seat 25 is formed on the valve chamber 24-side of the valve hole 26. A through hole 29 is formed vertically (the Y direction of FIG. 1) in the valve body 11 so as to communicate the return passage 30 with the narrow portion 28a. The valve hole 26, the through hole 29, the opening 32 and the valve chamber 24 are arranged so that their respective center axes are aligned in a straight line. The return passage 30 is formed further above the outlet port 28 in the valve body 11 and passes through the valve body 11 in a lateral direction (the X direction of FIG. 1). Further, a hole portion 33 that is coaxial with the through hole 29 and having a greater inner diameter than the through hole 29 is formed on a lower side of the return passage 30.

It should be noted that, in FIG. 1, although the inlet port 20 and the outlet port 28 are opened on the right and left sides of the valve body 11, and similarly, the return passage 30 is formed to pass through the right and left sides of the valve body 11, the arrangement of the inlet port, the outlet port and both openings of the return passage can be changed arbitrarily depending on the layout of the refrigerant cycle in which the expansion valve is disposed. For example, the outlet port 28 and the left side opening of the return passage 30 may be disposed to be opened to the front side or the back side of the drawing of FIG. 1 (that is, the inlet port and the outlet port may be arranged orthogonally when viewed from the center line of the valve rod 60, and similarly, both openings of the return passage may be arranged orthogonally).

The power element 70 is composed of an upper lid member 71 and a receiving member 72 having a through port 72b formed at a center portion thereof, both of which are formed of stainless steel or the like, for example, a diaphragm 73 sandwiched between the upper lid member 71 and the receiving member 72, and a stopper member 90 disposed between the diaphragm 73 and the receiving member 72. By circumferentially welding the edge portions where the upper lid member 71, the diaphragm 73 and the receiving member 72 overlap, these members are integrated. A pressure operation chamber 75 is formed between the upper lid member 71 and the diaphragm 73, and after filling the pressure operation chamber 75 with a working gas, the chamber is sealed with a sealing plug 65. The lower portion of the receiving member 72 is cylindrical, and an external screw 72a is formed on the periphery thereof. The power element 70 is attached to the valve body 11 by screwing the external screw 72a into the internal screw (the internal screw opening on the upper surface of the valve body 11) of the power element mounting portion 12 via a packing 35.

The valve element 40 is a spherical member that is disposed in the valve chamber 24 at a position opposed to the valve seat 25. The valve rod 60 is provided to pass through the valve hole 26, the through hole 29 and the opening 32 of the valve body 11, wherein an upper end of the valve rod 60 is abutted against a receiving portion 92 provided on a lower side of the stopper member 90 of the power element 70 and a lower end of the valve rod 60 is arranged to be in contact with the valve element 40. The second vibration isolation spring 500 is arranged in the hole portion 33 and elastically supports the valve rod 60. The details of the second vibration isolation spring 500 will be described later.

The support member 100 is a member that supports the valve element 40 in the direction of the valve seat 25 (the direction of the valve rod 60). Although the valve element 40 is fixed to the support member 100, since the support member 100 is constantly pushed toward the direction of the valve seat 25 and the valve rod 60 by the coil spring 44, a configuration in which the support member 100 merely contacts against the valve element 40 may be utilized. The support member 100 includes a body portion 103, an upper surface portion 101 and a flange portion 102. An upper surface of the cylindrical body portion 103 has a conical recess and serves as the upper surface portion 101 that supports a lower surface of the valve element 40. In addition, the support member 100 includes a flange portion 102 that protrudes toward a lateral side (the outer circumferential side) from the body portion 103, and a lower surface of the flange portion 102 is configured to receive one end of the first vibration isolation spring 140 and the coil spring 44. In this state, an outer diameter of the body portion 103 below the flange portion 102 is configured to be smaller than an inner diameter of the coil spring 44, such that the body portion 103 fits inside the coil spring 44.

The coil spring 44 is disposed between a lower surface of the flange portion 102 provided on the support member 100 and a concave portion 125 formed in the adjusting screw 120. Due to the elastic force of the coil spring 44, the valve element 40 is pushed toward the valve seat 25 via the support member 100. The first vibration isolation spring 140 is disposed between the lower surface of the flange portion 102 and the coil spring 44, the detailed configuration of which will be described later.

The adjusting screw 120 includes a body portion 121, a hexagonal socket 122, an insertion portion 123, a leading edge portion 124, and the concave portion 125. The insertion portion 123 is formed above the body portion 121 with a smaller outer diameter than the body portion 121, and the leading edge portion 124 is formed above the insertion portion 123 with a smaller outer diameter than the insertion portion 123. In addition, the outer circumference of the body portion 121 is formed to be an external screw portion 121a designed to engage with the internal screw 11a formed on a lower side of the valve body 11. Further, a concave portion 125 having a cylindrical space with the upper portion opened is provided on an upper portion of the adjusting screw 120. The concave portion 125 is formed to have a depth that reaches the vicinity of the body portion 121. In addition, the inner diameter of the concave portion 125 is designed to be slightly greater than the outer diameter of the coil spring 44, such that the coil spring 44 is stably disposed inside the concave portion 125. Furthermore, the hexagonal socket 122 that allows insertion of a hexagonal wrench (not shown) for turning the adjusting screw 120 is disposed at a lower portion of the adjusting screw 120 (the body portion 121).

Figure 3:
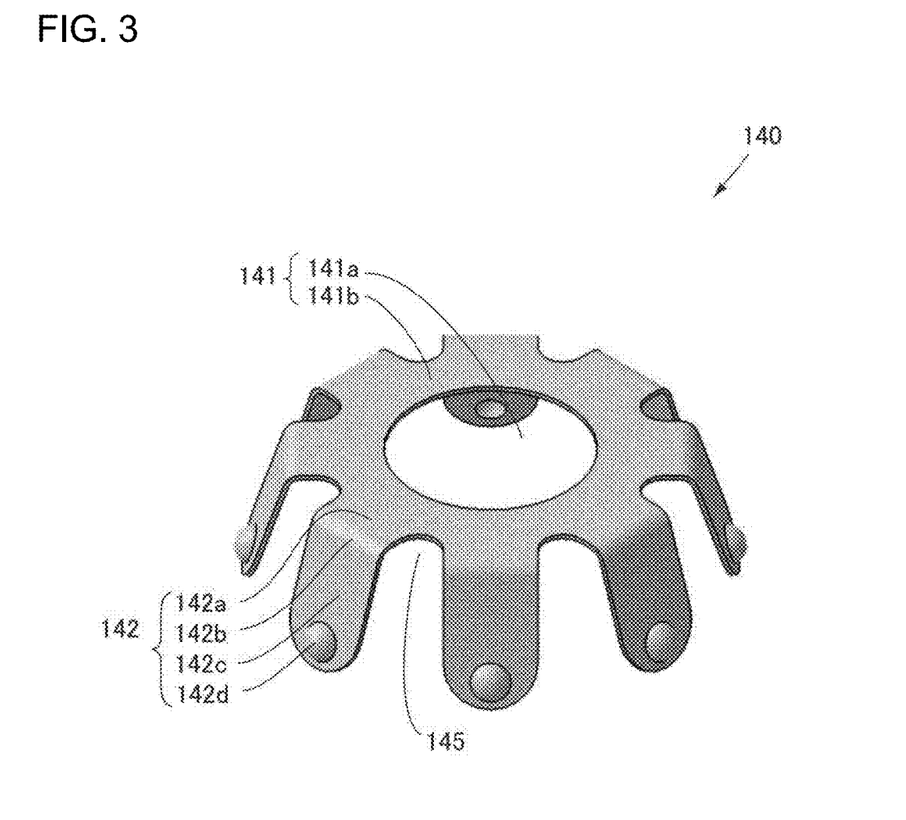
FIG. 3 is a perspective view illustrating a first vibration isolation spring according to the first embodiment.
Figure 4:
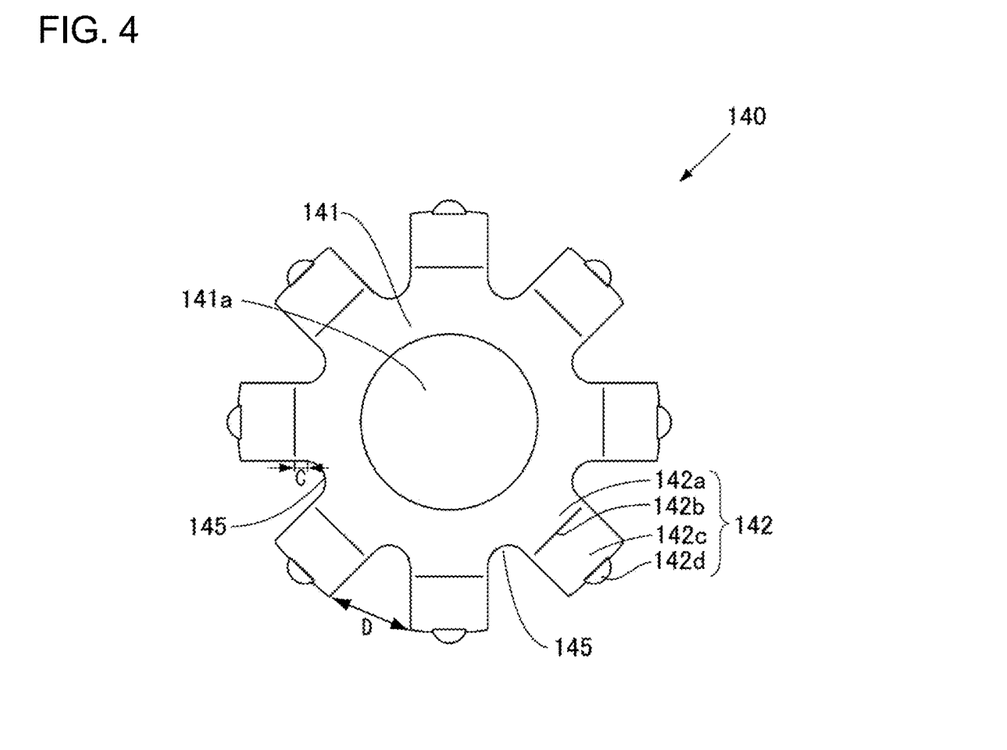
FIG. 4 is a plan view illustrating the first vibration isolation spring according to the first embodiment.
Figure 5:
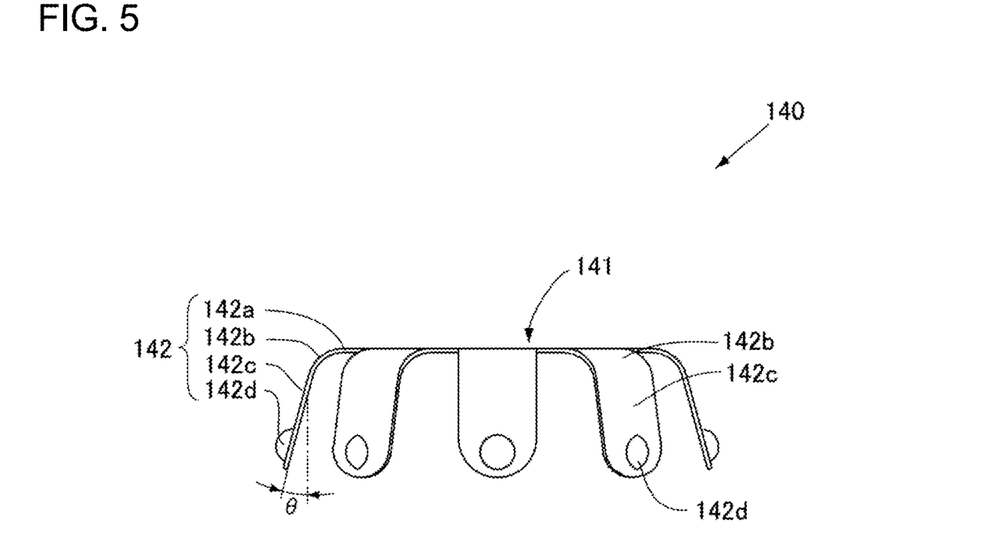
FIG. 5 is a side view illustrating the first vibration isolation spring according to the first embodiment.

FIG. 3 is a perspective view illustrating the first vibration isolation spring 140 according to a first embodiment. FIG. 4 is a plan view illustrating the first vibration isolation spring 140 according to the first embodiment. FIG. 5 is a side view illustrating the first vibration isolation spring according to the first embodiment. The vibration isolation spring 140 includes a base portion 141 and a leg portion 142. The first vibration isolation spring 140 can be formed by press-forming a plate member having elasticity, such as stainless steel or an alloy thereof, for example.

The base portion 141 is an annular plate-like member that forms an upper portion of the first vibration isolation spring 140 and includes a mounting hole 141a formed at the center thereof.

A plurality of the leg portions 142 extend from an outer circumferential side of the base portion 141 in a direction perpendicular with respect to a tangent in the circumferential direction; that is to say, radially. In the first embodiment, eight leg portions 142 having the same lengths are provided at regular angular intervals. Each leg portion 142 is composed of an upper portion 142a, a bent portion 142b, a side portion 142c, and a projected portion 142d. The leg portions 142 are bent downward at the bent portion 142b.

The upper portion 142a is formed substantially on the same plane as the base portion 141. Therefore, in the base portion of each of the leg portions 142, a cutout 145 having a predetermined shape is formed respectively on the side having the base portion 141. In FIG. 4, length C refers to the length of the upper portion 142a. Since the leg portions 142 include the upper portions 142a, the leg portions 142 are formed closer to a center side of the base portion 141 than the bent portions on the same plane as the base portion 141. In addition, in the vicinity of the connecting portion of the upper portion 142a and the base portion 141 (near the base end of the leg portions 142), the cutouts 145 formed between the side surfaces in the width direction of adjacent upper portions 142a are formed in an arc shape by continuously connecting base sides of the upper portions 142a with the same curvature, and as a result, the upper portions 142a (the leg portions 142) are smoothly connected to each other. Of course, the cutouts 145 may also be formed in a shape other than an arc-shape by connecting the base sides of the upper portions 142a with a different curvature.

The bent portion 142b is formed continuously bending outward from the upper portion 142a toward the lower side (toward the coil spring 44). The bent portion 142b may be formed with a fixed curvature radius. The bent portion 142b is formed by bending the portion with a (90-θ) degree bending process.

The side portion 142c is formed in a straight line that extends continuously downward from the bent portion 142b. The angle of the side portion 142c is θ degrees toward an outer downward direction with respect to the vertical direction.

The projected portion 142d is formed outward in the vicinity of the lower end of the side portion 142c. For example, the projected portion 142d may be formed as a part of a spherical surface, such as a hemispherical shape, or as portion of another curved surface. When the projected portion 142d is mounted on the valve body 11, although the projected portion 142d elastically contacts a portion above the opening portion of the inlet hole 20a (the upper wall surface 24a), the dimensions of the respective portions are designed such that the projected portion 142d is not inserted into the opening of the inlet hole 20a even if the valve element 40 is positioned at a lowermost position.

Although the vertical length of the leg portions 142 may be set to an arbitrary length as long as the lower edge portions of the leg portions 142 do not fall into the opening portion of the inlet hole 20a at the lowermost end of the vertical movement range of the first vibration isolation spring 140, in in order to prevent interference of the flow of refrigerant introduced from the inlet port 20, and in order to prevent drop of flow rate or occurrence of turbulence, it is preferable that the lower edge portion of the leg portions 142 does not reach the opening of the inlet hole 20a. In addition, according to the present embodiment, although the widths of the respective leg portions 142 are formed to be constant in each of the upper portion 142a, the bent portion 142b and the side portion 142c, the present invention is not restricted to this example, and narrowing or widening the width at the leading ends or other design modifications for most effectively suppressing the vibration of the valve element may be utilized. In addition, the thickness of the leg portions 142 (the thickness of the vibration isolation spring 140 in the case that the vibration isolation spring 140 is formed by press-forming a single elastic plate material) may be configured to a thickness that is suitable for suppressing the vibration of the valve element.

In the first vibration isolation spring 140, a gap D (FIG. 4) through which the refrigerant passes is formed between the respective adjacent leg portions 142. In addition, the outer diameter connected by the leading edge portions of the projected portion 142d of the first vibration isolation spring 140 is formed to be greater than the inner diameter of the upper wall surface 24a within the valve chamber 24, such that an elastic force acts when the first vibration isolation spring 140 is mounted, and the projected portions 142d are pressed against the upper wall surface 24a of the valve chamber 24. In addition, a space large enough for the coil spring 44 to be disposed therein is secured on the inner side of the leg portions 142.

As illustrated in FIGS. 1 and 2, when attaching the first vibration isolation spring 140, first, the first vibration isolation spring 140 is passed through the mounting hole 141a from the lower side to the body portion 103 of the support member 100, and the upper surface of the base portion 141 of the first vibration isolation spring 140 is brought into contact with the lower surface of the flange portion 102 of the support member 100. Next, the coil spring 44 is attached from the lower side of the first vibration isolation spring 140. In this state, the body portion 103 of the support member 100 is disposed on an inner side of the coil spring 44, and the upper surface of the coil spring 44 abuts against the lower surface of the base portion 141 of the first vibration isolation spring 140. In this way, the first vibration isolation spring 140 is disposed inside the valve chamber 24.

In the expansion valve 10 to which the first vibration isolation spring 140 is attached, since the base portion 141 of the first vibration isolation spring 140 is pushed by the coil spring 44 from the lower side, the vibration isolation spring 140 is attached by being sandwiched between the flange portion 102 of the support member 100 and the coil spring 44 with a predetermined force. Then, in the vibration isolation spring 140, the projected portions 142d are pushed toward the upper wall surface 24a of the valve chamber 24 with a predetermined force due to the elastic force of the leg portions 142, and a sliding resistance is generated in accordance with the movement of the valve element 40.

Figure 6:
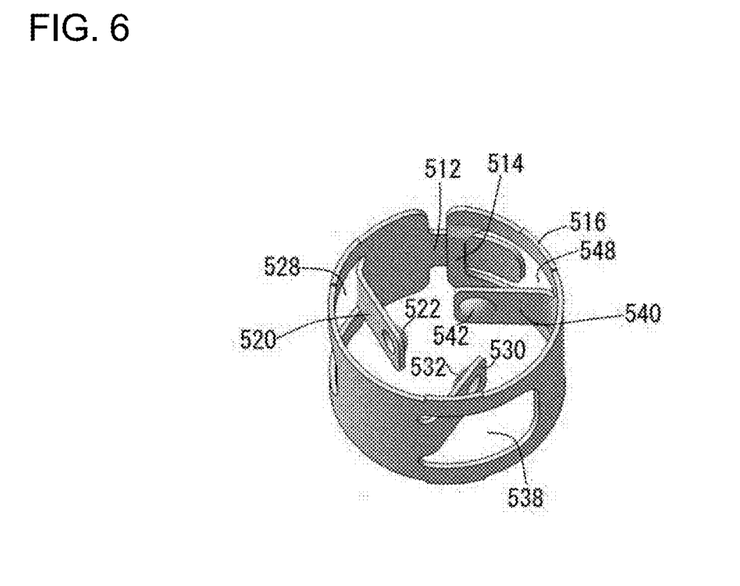
FIG. 6 is a perspective view illustrating a second vibration isolation spring according to the first embodiment.
Figure 7A:
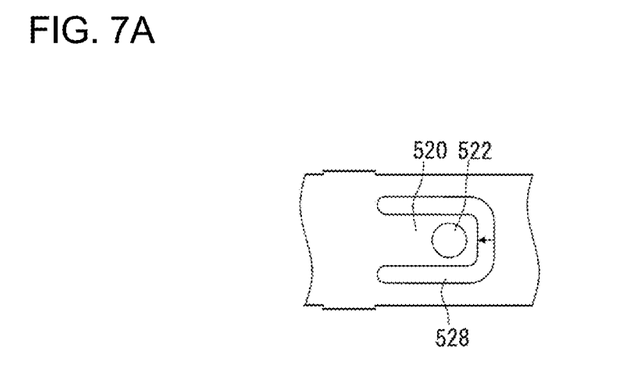
FIG. 7A is a partial explanatory view of the second vibration isolation spring according to the first embodiment.
Figure 7B:
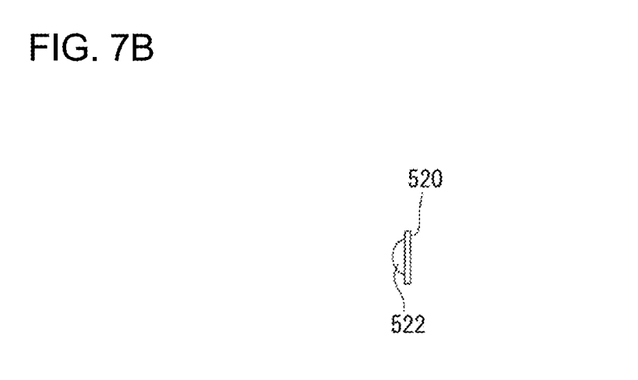
FIG. 7B is a side view illustrating a main portion of the second vibration isolation spring according to the first embodiment.
Figure 8:
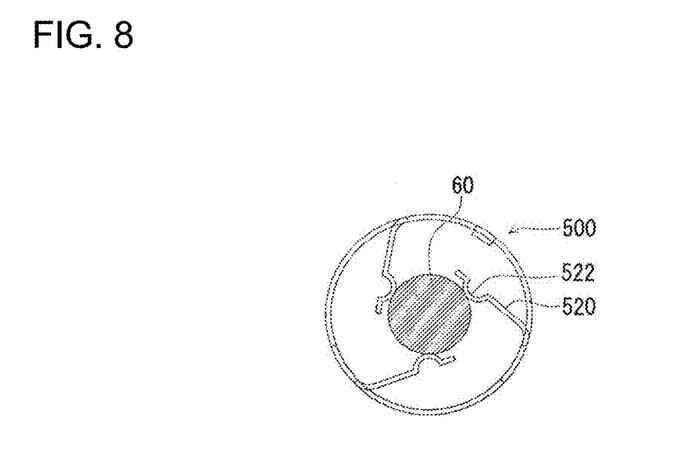
FIG. 8 is a plan view illustrating a state in which a valve rod is mounted to a second vibration isolation spring according to the first embodiment.

FIG. 6 is a perspective view illustrating a second vibration isolation spring 500 of the first embodiment. FIG. 7A is a development front view of a main portion of the second vibration isolation spring according to the first embodiment. FIG. 7B is a cross-sectional view of a main portion of the second vibration isolation spring according to the present embodiment. FIG. 8 is a cross-sectional view illustrating a state in which a valve rod is attached to the second vibration isolation spring of the first embodiment. The second vibration isolation spring 500 is formed by bending a plate-like member into a cylindrical shape, as illustrated in FIG. 6, and bending a first elastic piece 520, a second elastic piece 530 and a third elastic piece 540 inward.

Although the first elastic piece 520, the second elastic piece 530 and the third elastic piece 540 are bent to inward, the first protruded contact portion 522, the second protruded contact portion 532 and the third protruded contact portion 542 are designed to be located at positions such that the circumference is equally divided. A diameter dimension of the circle connecting the tip portions of the first protruded contact portion 522, the second protruded contact portion 532 and the third protruded contact portion 542 are formed to have a smaller diameter than the valve rod 60.

The second vibration isolation spring 500 can be formed by subjecting an elongated elastic metal plate to press working.

A tongue piece 512 is provided at one end portion in the longitudinal direction of the elastic metal plate, and a tongue piece receiving portion 514 for receiving the tongue piece 512 when the elastic metal plate is bent into a cylindrical shape is formed at the other end portion. The protruded portion 516 is used, for example, when processing the elastic metal plate into a cylindrical shape.

FIG. 7A is an explanatory partial view of the second vibration isolation spring 500 illustrating a state prior to bending the first elastic piece 520. FIG. 7B is a side view illustrating a main portion of the second vibration isolation spring 500 in a state prior to bending the first elastic piece 520. The second vibration isolation spring 500 is formed of a belt-shaped metal plate 500a having elasticity, on which a U-shaped first cutout portion 528 is punched out to form the first elastic piece 520, and the first protruded contact portion 522, which is a hemispherical-surface portion, is formed on a leading end portion thereof. Similarly, the second elastic piece 530 and the third elastic piece 540 are configured by forming a second cutout portion 538 and a third cutout portion 548, and forming a second protruded contact portion 532 and a third protruded contact portion 542, which are hemispherical-surface portions, on the leading end thereof.

Then, the bases of the first, second and third elastic pieces 520, 530 and 540 are bent from one direction, and thereafter, as illustrated in FIG. 6, the first, second and third elastic pieces 520, 530 and 540 are bent from the base portions such that the first, second and third protruded contact portions 522, 532 and 542 face inward.

FIG. 8 is a plan view illustrating a state in which a valve rod 60 is inserted to a second vibration isolation spring 500 of the first embodiment. The valve rod 60 is supported by having protruded contact portions respectively formed on the leading edges of the three elastic pieces contact three areas of the circumference side surface of the valve rod 60 at even intervals. It should be noted that the number of elastic pieces may be set to an arbitrary number greater than or equal to 2.

Next, the operation of the present embodiment will be described. In the expansion valve 10 of the first embodiment according to the present invention, a high-pressure refrigerant discharged from a compressor (not shown) flows from the inlet port 20 through the inlet hole 20a into the valve chamber 24, passes through the valve hole 26 and expands, and is subsequently sent out through the outlet port 28 to an evaporator (not shown). The refrigerant sent out from the evaporator enters from the left side entrance of the return passage 30, passes through the return passage 30 to exit from the right side exit and returns to the compressor. At this time, a portion of the refrigerant passing through the return passage 30 flows through the opening 32 to a lower portion of the power element 70. Then, the temperature change of the refrigerant that flows to the lower portion of the power element 70 causes the pressure of the working gas inside the pressure operation chamber 75 to change accordingly. At this time, the stopper member 90 moves up and down in response to the movement of the diaphragm 73 that deformed according to the fluctuation of the internal pressure of the pressure operation chamber 75. The movement of the stopper member 90 is transmitted through the valve rod 60 to the valve element 40, and the flow rate of the expanded refrigerant is controlled.

In the case that the valve element 40 moves in an opening and closing direction (the vertical direction), the first vibration isolation spring 140 moves together with the valve element 40 and the support member 100. At this time, since the first vibration isolation spring 140 presses the upper wall surface 24a of the valve chamber 24 of the valve body 11 with a predetermined force, when the first vibration isolation spring 140 moves in a sliding motion, a frictional force is generated between the projected portion 142d of the leg portions 242 and the upper wall surface 24a of the valve chamber 24. In this way, the valve element 40 and the support member 100 do not respond sensitively in the vertical direction due to the pressure fluctuation of the high-pressure refrigerant from the inlet port 20, and the vibration in the vertical direction can be prevented or reduced. Further, since the plurality of leg portions 142 of the first vibration isolation spring 140 press the upper wall surface 24a of the valve chamber 24 at multiple positions, the valve element 40 and the support member 100 do not move easily in the lateral direction opposing to the pressing force due to the pressure fluctuation of the high-pressure refrigerant from the inlet port 20, and they exert an effect of preventing vibration in the lateral direction. At the same time, the movement of the valve element 40 and the support member 100 in the vertical direction is guided.

In addition, since the first vibration isolation spring 140 is in contact with the upper wall surface 24a above the inlet hole 20a in the valve chamber 24, the leg portions 142 do not interfere with the inlet hole 20a, such that the flow rate and the occurrence of turbulence of the refrigerant can be suppressed and the passing noise of the refrigerant can be reduced. In addition, since the first vibration isolation spring 140 is constituted by the radially extending leg portions 142, the vibration isolation spring can be easily attached in the valve body 11 by simple insertion through the opening portion of the internal screw 11a formed at the bottom portion of the valve body 11. Further, since the first vibration isolation spring 140 has a certain cutout depth (the cutout 145) on the surface having the base portion 141, the length of the leg portions 142 can be set to be greater than the height of the vibration isolation spring. Accordingly, the spring constant of the leg portions 142 can be reduced, and the change in force with respect to the deformation of the leg portions 142 can be made to be smaller, such that a more stable sliding resistance can be obtained. In addition, since the same widths are used for the leg portions 142, the calculation of the spring constant, that is, the design of the first vibration isolation spring 140, becomes easier. Further, since the leg portions 142 are formed in a direction perpendicular (radial) with respect to a tangent in the circumferential direction of the base portion 141, the sliding resistance is generated without applying the torsional force of the base portion 141 in the circumferential direction.

Further, in this embodiment, a second vibration isolation spring 500 that elastically supports the valve rod 60 is arranged in addition to the first vibration isolation spring 140, and the second vibration isolation spring 500 is configured to further provide a predetermined sliding friction in the driving direction of the valve rod 60. That is, even in cases where the vibration of the valve element 40 cannot be suppressed by the first vibration isolation spring 140 alone, it is possible to effectively suppress the vibration of the valve element 40 by additionally arranging the second vibration isolation spring 500.

Second Embodiment

Figure 9:
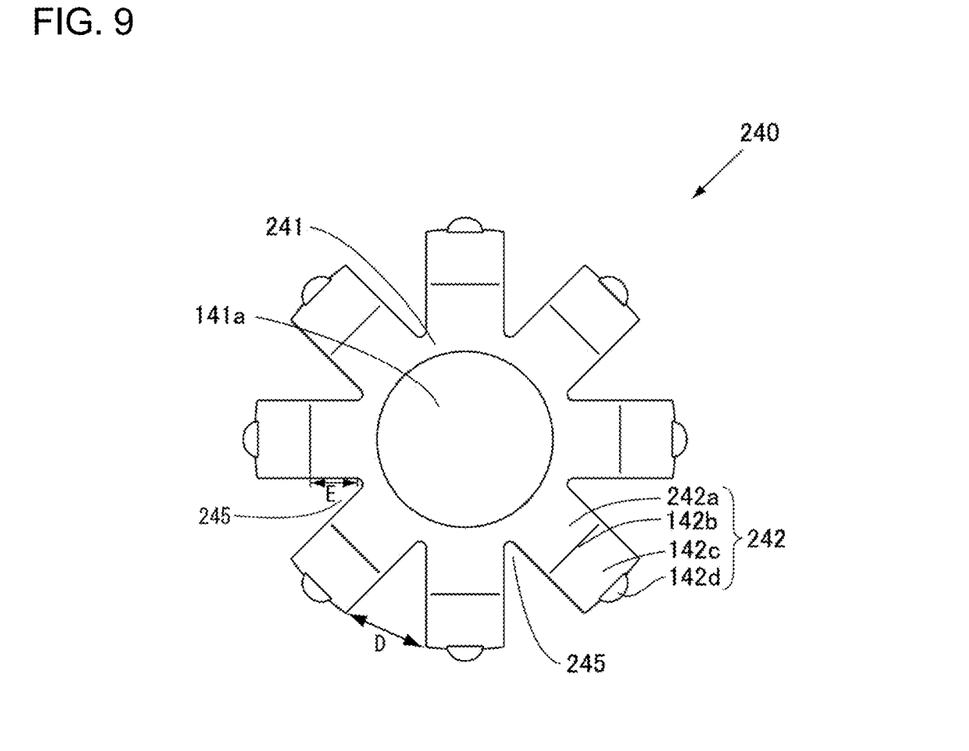
FIG. 9 is a plan view illustrating a first vibration isolation spring according to a second embodiment.

FIG. 9 is an upper view illustrating a first vibration isolation spring according to a second embodiment. The second embodiment has a configuration in which the first vibration isolation spring 140 of the first embodiment is replaced with a first vibration isolation spring 240, and since the rest of the configuration is the same as the first embodiment, a description of the shared elements is omitted.

The first vibration isolation spring 240 includes a base portion 241 and a leg portion 242. The first vibration isolation spring 240 is formed by press-forming a plate member having elasticity, such as stainless steel or an alloy thereof, for example.

The base portion 241 is an annular plate-like member that forms the upper portion of the first vibration isolation spring 240 and includes a mounting hole 141a formed at a center thereof, similar to the first embodiment.

A plurality of the leg portions 242 extend from an outer circumferential side of the base portion 241 in a direction perpendicular with respect to a tangent in the circumferential direction; that is to say, radially. In the second embodiment, eight leg portions 242 having the same lengths are provided at regular angular intervals. Each leg portion 242 is composed of an upper portion 242a, a bent portion 142b, a side portion 142c and a projected portion 142d. The bent portion 142b, the side portion 142c and the projected portion 142d are the same as in the first embodiment.

Herein, although the first embodiment includes an arc-shaped cutout 145, the second embodiment differs in that a substantially triangular cutout 245 is provided. Accordingly, the length E of the upper portion 242a according to the second embodiment is longer than the length C of the upper portion 142a of the first embodiment. The length of the leg portions 242 of the second embodiment is set to be longer in correspondence thereto. In addition, the outer circumference of the base portion 241 of the second embodiment is set to be smaller than the outer circumference of the base portion 141 of the first embodiment. It should be noted, in consideration of strength and stress concentration, small arc-shaped portions may be formed in the side surfaces of adjacent upper portions 242a in the width direction.

In the second embodiment, the length of the first vibration isolation spring 240 can be further extended by forming the substantially triangular cutout 245. Accordingly, the spring constant of the leg portions 242 can be further reduced, the change in force of the leg portions 242 with respect to the deformation can be reduced, and a more stable sliding resistance can be achieved.

Third Embodiment

Figure 10:
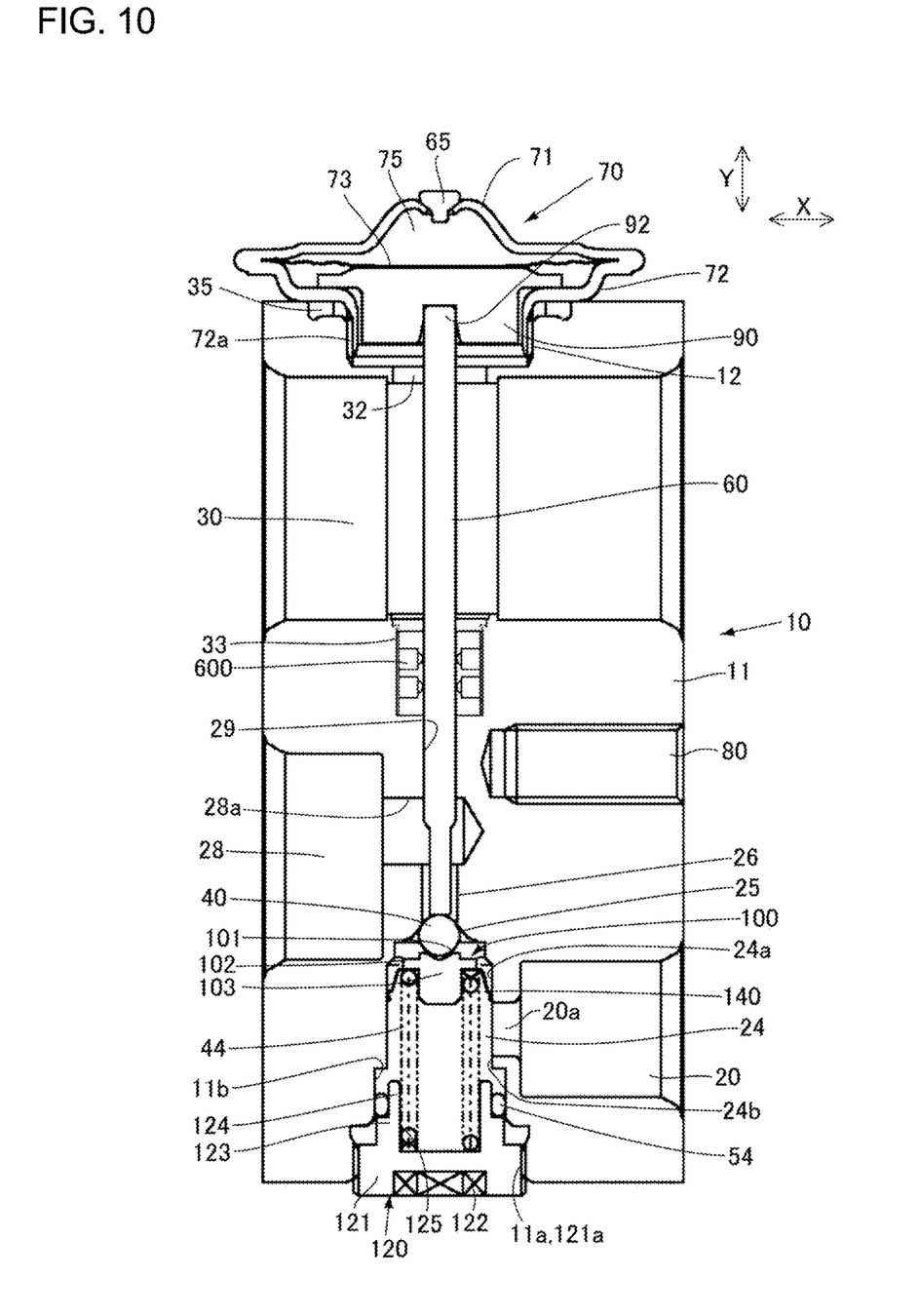
FIG. 10 is a vertical cross-sectional view illustrating a third embodiment of an expansion valve according to the present invention.
Figure 11:
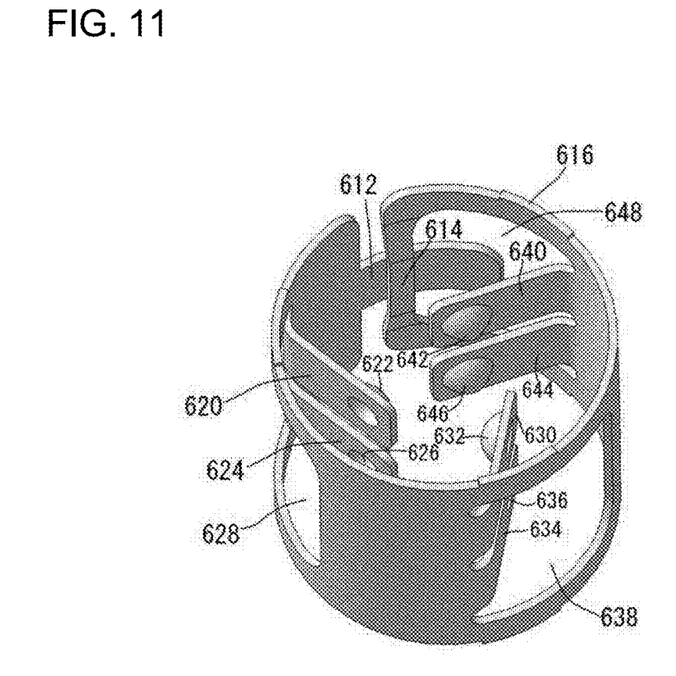
FIG. 11 is a perspective view illustrating a second vibration isolation spring according to a third embodiment.

FIG. 10 is a vertical cross-sectional view illustrating a third embodiment of the expansion valve according to the present invention. FIG. 11 is a perspective view illustrating a second vibration isolation spring according to the third embodiment. The third embodiment has a configuration in which the second vibration isolation spring 500 (where one row of a set of three elastic pieces is arranged) of the first embodiment is replaced with a second vibration isolation spring 600 (where two rows each having a set of three elastic pieces are arranged), and since the rest of the configuration is the same as the first embodiment, a description of the shared elements is omitted.

The second vibration isolation spring 600 can be formed by subjecting an elongated elastic metal plate to press working.

A tongue piece 612 is provided at one end portion in the longitudinal direction of the elastic metal plate, and a tongue piece receiving portion 614 for receiving the tongue piece 612 when the elastic metal plate is bent into a cylindrical shape is formed at the other end portion. The protruded portion 616 is used, for example, when processing the elastic metal plate into a cylindrical shape.

Each of the protruded contact portions (622, 626, 632, 636, 642, 646), which are hemispherical-surface portions, are formed at the leading edge portions of the respective elastic pieces (620, 624, 630, 634, 640, 644), and cutout portions (628, 638, 648) are formed in the longitudinal direction. Then, each elastic piece (620, 624, 630, 634, 640, 644) is bent inward.

In the third embodiment, as spring force is applied from a total of six elastic pieces (620, 624, 630, 640, 644) to provide more firm and stable support, a more effective vibration isolation effect can be demonstrated in addition to the vibration isolation effect of the first vibration isolation spring.

In the above-described embodiment, although an example was illustrated in which two rows each having a set of three elastic pieces are arranged, the number of elastic pieces may be selected from an arbitrary number of two or greater, as long as a plurality of elastic pieces are arranged in two rows at equal intervals on the circumferential side wall of the valve rod 60. The number of rows may also be greater than or equal to 2.

Fourth Embodiment

Figure 12:
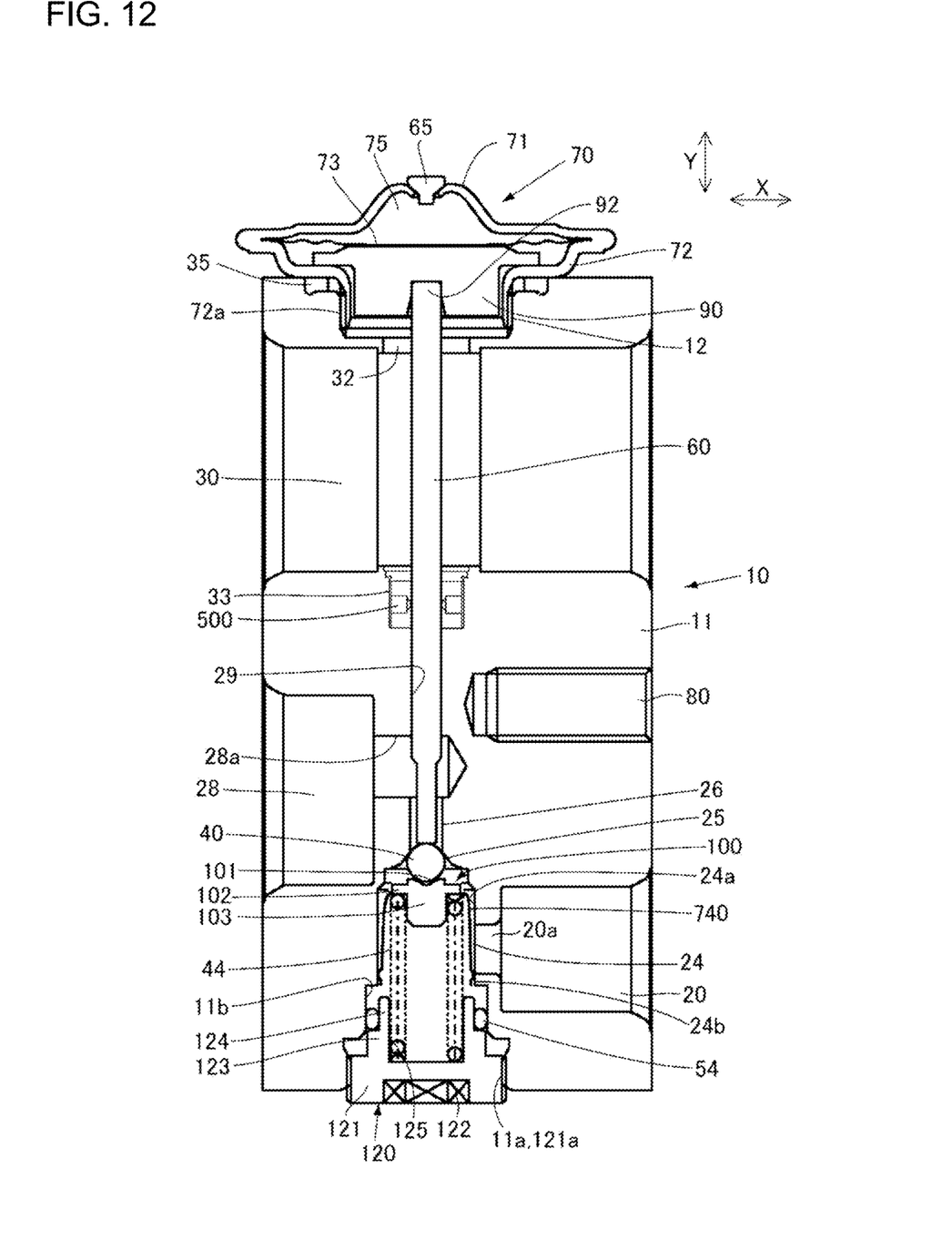
FIG. 12 is a vertical cross-sectional view illustrating a fourth embodiment of the expansion valve according to the present invention.

FIG. 12 is a vertical cross-sectional view illustrating a fourth embodiment of an expansion valve according to the present invention. The fourth embodiment has a configuration in which the first vibration isolation spring 140 of the first embodiment is replaced with a first vibration isolation spring 740, and since the rest of the configuration is the same as the first embodiment, a description of the shared elements is omitted.

Similar to the first vibration isolation spring 140, the first vibration isolation spring 740 includes a base portion and eight leg portions of the same length, but the leg portions according to the fourth embodiment are longer than the first vibration isolation spring 140. That is, the leg portions of the first vibration isolation spring 140 is in contact with the upper wall surface 24a above the inlet hole 20a in the valve chamber 24, whereas the leg portions of the first vibration isolation spring 740 are in contact with a lower wall surface 24b. Then, in the first vibration isolation spring 740, the projected portions are pushed toward the lower wall surface 24b of the valve chamber 24 with a predetermined force due to the elastic force of the leg portions, and a sliding resistance is generated in accordance with the movement of the valve body 40.

The length of the lower wall surface 24b in the vertical direction preferably has a length with enough thickness to provide the necessary strength between the upper portion of the insertion hole 11b and the inlet hole 20a, and should have a length in the vertical direction that is sufficient for the first vibration isolation spring 740 to move in a sliding motion.

It should be noted that, in the above-described embodiment, although an example has been illustrated of a case where all eight leg portions of the first vibration isolation spring 740 are in contact with the lower wall surface 24b, it is also possible to utilize long and short legs that are arranged alternately. That is, for example, long legs that contact the lower wall surface 24b and short legs that contact the upper wall surface 24a may be arranged alternately.

As described above, the first, second, third and fourth embodiments have been illustrated as embodiments of the present invention, but the present invention is not restricted to the embodiments described above, and various modifications are included in the scope of the invention. For example, the present invention is not restricted to a configuration including all the components (structures) provided in the above-described embodiments. In addition, a portion of a configuration of one embodiment may be deleted or replaced with a configuration of another embodiment, or a configuration of one embodiment may be added to the configuration of another embodiment.

For example, in the above-described embodiments, the leg portions 142 and 242 are illustrated as having eight leg portions 142 of the same length provided at regular angular intervals. If the number of leg portions 142 and 242 is eight, it becomes possible to ensure stability of behavior and sliding restriction while maintaining balance of the gaps between the leg portions, but the present invention is not restricted to this example. The number of leg portions should merely be two or greater, and the lengths and angular intervals need not be the same. In addition, the leg portions illustrated in the above embodiments can have widths that vary along their length.

Furthermore, although the power element 70 illustrated in the embodiments is attached by screws, in addition to this, a configuration can be utilized in which a cylindrical portion is formed on an upper portion of the valve body, the power element 70 is inserted inside of the cylindrical portion, and caulking is performed on the inner side of the cylindrical portion to thereby attach the power element 70.

REFERENCE SIGNS LIST

10 expansion valve
11 valve body
20 inlet port
20a inlet hole
24 valve chamber
24a upper wall surface
25 valve seat
26 valve hole
28 outlet port
30 return passage
40 valve element
44 coil spring
60 valve rod
70 power element
100 support member
120 adjusting screw
140, 240, 740 first vibration isolation spring
141, 241 base portion
142, 242 leg portion
500, 600 second vibration isolation spring

The invention claimed is:

1. An expansion valve comprising:
a valve body including an inlet hole through which a refrigerant flows into a valve chamber, and a valve hole through which the refrigerant flows out from the valve chamber;
a valve element configured to adjust an amount of the refrigerant flowing through the valve hole;
a support member configured to support the valve element;
a coil spring configured to press the valve element in a valve-closing direction via the support member;
a power element that is mounted to the valve body and configured to drive the valve element via a valve rod;
a first vibration isolation spring that is provided in the valve chamber and configured to prevent vibration of the valve element; and
a second vibration isolation spring that is in contact with the valve rod and configured to prevent vibration of the valve element,
wherein the first vibration isolation spring includes an annular base portion disposed between the support member and the coil spring, and a plurality of leg portions that extend radially from the annular base portion and that abut against an inner wall of the valve chamber, and
each of the plurality of leg portions includes a valve element side portion radially formed in a same plane as the annular base portion, a bent portion that bends from the valve element side portion toward the coil spring, a side portion extending downward from the bent portion, and a projected portion formed outward from the side portion, and
the projected portion abuts against the inner wall of the valve chamber at a position between the valve hole and the inlet hole, and dimensions of respective portions of the leg portions are designed such that the projected portion is not inserted into the opening portion of the inlet hole even if the valve element is positioned at the farthest position from the valve hole.

2. The expansion valve according to claim 1, wherein:
each of the plurality of leg portions of the first vibration isolation spring is in contact with a side wall surface of the valve chamber on a valve hole side of the inlet hole.

3. The expansion valve according to claim 1,
wherein the valve element side portion is defined by a notch formed between the plurality of leg portions in a same plane as the annular base portion.

4. The expansion valve according to claim 3,
wherein the notch has an arc-shape.

5. The expansion valve according to claim 3, wherein the notch has a substantially triangular shape.

6. The expansion valve according to claim 1, wherein the valve element side portion, the bent portion, and the side portion have a constant width in each of the plurality of leg portions.

7. The expansion valve according to claim 1,
wherein the second vibration isolation spring includes a plurality of elastic pieces that are in contact with the valve rod.

* * * * *